United States Patent Office 3,792,035
Patented Feb. 12, 1974

1

3,792,035
MONO-ACETYL DERIVATIVES OF ANTIBIOTIC SF–837 AND SF–837-A₂ SUBSTANCES AND PRODUCTION THEREOF
Shunzo Fukatsu, Tokyo, Tetsuo Ishikawa, Taro Miuro, and Taro Niida, Yokohama, Bunzo Nomiya, Tokyo, and Takemi Koeda, Yokohama, Japan, assignors to Meji Seika Kaisha, Ltd., Tokyo, Japan
Filed Apr. 21, 1971, Ser. No. 135,858
Claims priority, application Japan, May 4, 1970, 45/37,456
Int. Cl. C07c 129/18
U.S. Cl. 260—210 AB        3 Claims

ABSTRACT OF THE DISCLOSURE

New mono-acetates of antibiotics SF–837 substance and SF–837-A₂ substance represented by the formula

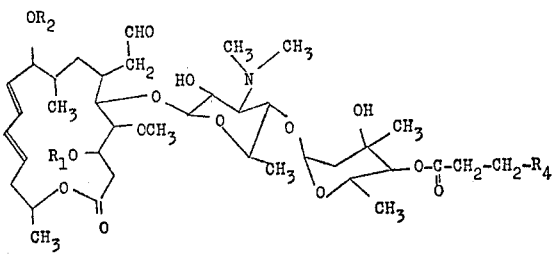

where $R_1$ is a propionyl group, $R_2$ is an acetyl group, and $R_4$ is hydrogen atom or methyl group, may be produced by partially hydrolyzing under non-acidic conditions the di-acetates of SF–837 substance and SF–837-A₂ substance, respectively, which have been derived by acetylating the SF–837 substance and SF–837-A₂ substance in the form of the free bases as prepared through the cultivation of *Streptomyces mycarofaciens* identified as ATCC No. 21454. The mono-acetates of the SF–837 and SF–837-A₂ substances are much more excellent as the anti-bacterial agent than their corresponding free bases and di-acetates.

---

The present invention relates to new and useful compounds, that is, mono-acetate of SF–837 substance and of SF–837-A₂ substance which may be derived from macrolide antibiotics SF–837 substance and SF–837-A₂ substance, respectively and which are of remarkably improved therapeutic effects as well as to the production of the aforesaid mono-acetates.

The SF–837 substance and SF–837-A₂ substance are new macrolide antibiotics which are produced by cultivating a new species *Streptomyces mycarofaceiens* deposited unrestricted in the American Type Culture Collection, Washington, D.C. under ATCC No. 21454) of the genus Actinomycetes in known, conventional culture media under aerobic conditions and recovering them from the culture broth obtained. (See Belgian patent application No. 84,732 applied on Feb. 3, 1970 by the same applicants and now granted under Belgian Pat. No. 745,430 on Apr. 15, 1970.)

In this Belgian patent we have reported that the SF–837 substance and SF–837-A₂ substance (the free bases) give the corresponding di-acetyl derivatives, respectively when they are treated either alone or in the form of their mixture with an excess of acetic anhydride at room temperature in the presence of a tertiary organic base such as pyridine.

It has now been found that the di-acetate of each of the SF–837 substance and SF–837-A₂ substance (the free bases) may be represented by the following general formula:

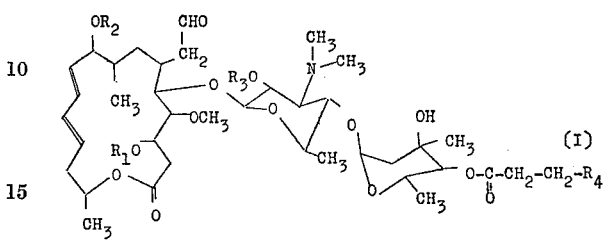

and that the SF–837 substance (free base) may be mentioned by its chemical name of 7 - (formylmethyl) - 4,10 - dihydroxy - 5 - methoxy-9,16-dimethyl - 2 - oxooxacyclohexadeca-11,13-diene-6-yl-3,6 - dideoxy - 4 - O-(2,6-dideoxy-3-C-methyl-α-L-ribohexopyranosyl) - 3 - (dimethylamino)-β-D-glucopyranoside 4,4-dipropionate (ester), and the SF–837-A₂ substance (free base) may be mentioned by its chemical name of 7 - (formylmethyl) - 4,10 - dihydroxy - 5 - methoxy - 9,16-dimethyl - 2 - oxacyclohexadeca - 11,13-dien-6-yl-3,6-dideoxy-4-O-(2,6 - dideoxy-3-C-methyl-α-L-ribohexopyranosyl) - 3 - (dimethylamino)-β-D-glucopyranoside 4-monopropionate (ester) 4-monobutyrate (ester).

The di-acetate of SF–837 substance corresponds to the compound of the above General Formula I where $R_1$ is propionyl group; $R_2$ and $R_3$ are acetyl group and $R_4$ is a hydrogen atom. Further, the diacetate of SF–837-A₂ substance corresponds to a compound of the above Formula I where $R_1$ is propionyl group; $R_2$ and $R_3$ are acetyl groups; and $R_4$ is a methyl group. It is noted that the SF–837 and SF–837-A₂ substance in the form of their free bases are corresponding to such compounds of the above Formula I, respectively, where both of $R_2$ and $R_3$ are hydrogen atoms.

We, the present inventors, now have succeeded in producing the mono-acetates of SF–837 substance and SF–837-A₂ substance which correspond to compounds of the above Formula I, where $R_3$ is a hydrogen atom, respectively, and we have discovered that these new mono-acetates of the SF–837 and SF–837-A₂ substances are not only remarkably improved in their therapeutic effects against bacterial infections but also reduced in their toxicity as compared to the above-mentioned corresponding free bases.

It has been found that when the SF–837 substance and SF–837-A₂ substance (free bases) are treated by means of conventional acylation method, namely by treating with acetic anhydride in the presence of an alkali, substantially all of the starting materials can be converted into their corresponding di-acetates. Although we varied and tested the acylation conditions in carrying out the acylation of the SF–837 and SF–837-A₂ substances (free bases) in the conventional manner, we failed to obtain the intended mono-acetates in appreciable yields. As a result of our further research, however, we have found that when the di-acetate of each of the SF–837 substance and SF–837–$A_2$ substance is partially hydrolyzed under neutral to alkaline conditions, the acetyl group occurring at the position $R_3$ of said di-acetates is liberated preferentially at first herefrom so that the mono-acetates desired can be formed and recovered in satisfactory yields.

According to the present invention, therefore, we provide a process for the production of at least one of the mono-acetates of SF–837 substance and SF–837–$A_2$ substance of the formula:

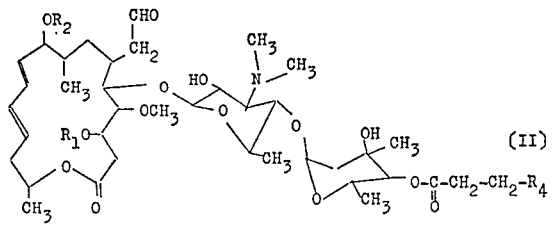

where $R_1$ is a propionyl group, $R_2$ is an acetyl group, and $R_4$ is a hydrogen atom or a methyl group, which comprises partially hydrolyzing at least one of the SF–837 substance di-acetate and SF–837–$A_2$ di-acetate represented by the formula:

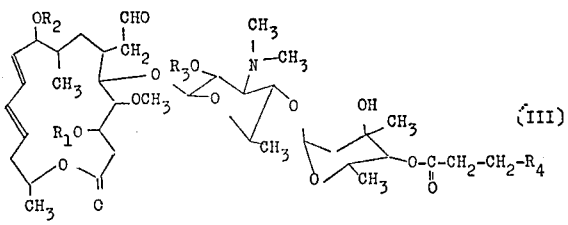

where $R_1$, $R_2$ and $R_4$ have the same meanings as defined above and $R_3$ is an acetyl group, in the presence of at least a stoichiometrically required amount of water for the partial hydrolysis and under neutral to alkaline conditions, namely non-acidic conditions.

The mono-acetates of SF–837 substance and SF–837–$A_2$ substance produced by the process of the present invention are new and useful products, as they exhibit remarkably improved therapeutic effects (that is, lower $CD_{50}$ values and lower toxicity) which are unexpected from the behaviors of the SF–837 substance (free base) and the SF–837–$A_2$ substance (free base). According to another aspect of the present invention, therefore, we provide, as new and useful products, the mono-acetates of SF–837 substance and the SF–837–$A_2$ substance represented by the formula

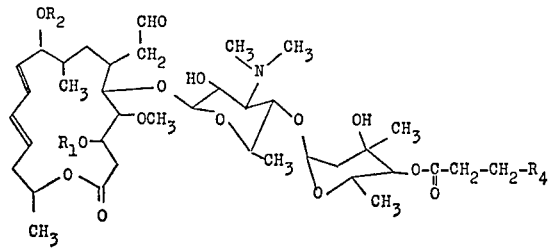

where $R_1$ is a propionyl group, $R_2$ is an acetyl group, and $R_4$ is a hydrogen atom or a methyl group.

The di-acetates of SF–837 substance and SF–837–$A_2$ substance which may be used as the starting materials for the process of the present invention are substantially insoluble in water. In the process of the present invention, therefore, it is desirable that the hydrolyzing reaction is carried out in a solution of the starting di-acetate or di-acetates of the above Formula III in an organic solvent such as ethanol or methanol which can dissolve the starting di-acetates therein but is inert to the reaction. In the process of the present invention, it is naturally necessary that the presence of at least an amount of water stoichiometrically required for the partial hydrolysis should be provided in the reaction system. In the process of the present invention, therefore, water should be present in the reaction system at least at an amount which is stoichiometrically required for the partial hydrolysis of the starting di-acetates. In case commercially available common methanol or ethanol is used as the aforesaid organic solvent in the process of the present invention, however, it is not necessary to add an amount of water because the methanol or ethanol normally contains a minor proportion of water which is enough to provide the required amount of water to effect the partial hydrolysis of the starting di-acetates. Of course, however, it may be feasible to add an additional amount of water. Nevertheless, when it is desired that the hydrolyzing reaction is carried out in a homogeneous phase in the solution in an organic solvent, the amount of water to be added should be limited to a small one such that the starting di-acetates cannot be deposited by the water present in the reaction mixture. Organic solvents which may be used in the process of the present invention generally includes lower aliphatic alcohols or ester derivatives thereof, such as methanol, ethanol, propanol and butanol as well as ethyl acetate and butyl acetate. Methanol and ethanol are particularly preferred.

In the process of the present invention the hydrolysis is effected under the reaction conditions of neutral or alkaline nature. The alkaline reaction conditions are preferred as they lead to the higher reaction rate. In order to establish the reaction conditions of alkaline nature, it is suitable to add an amount of ammonia or an alkali to the reaction medium. Alkalis available for this purpose include a hydroxide, carbonate or bicarbonate of an alkali metal, for example, sodium, potassium or lithium. An hydroxide or another compound of an alkaline earth metal may be used as long as they are soluble in the reaction medium and impart the alkalinity thereto. In the process of the present invention, the pH in the reaction medium may be of varying values as long as it is within the range of neutral to alkaline.

The hydrolysis or saponification reactions should proceed to a limited extent, namely to a partial extent in the process of the present invention. Thus, it is necessary that the saponification reaction should take place preferentially on the acetyl group corresponding to the —$OR_3$ group of the above Formula III while the saponification reaction should occur as little as possible at the position of the acetyl —$OR_2$ group. In order to enable this partial saponification to be effected preferentially, it is needed that the reaction temperature, the reaction time and, if necessary, the concentration of the alkali additive and hence the pH value is controlled suitably depending on the nature and concentration of the starting materials employed. Suitable and optimum values for the reaction temperature, time and pH and other operating conditions may be determined readily by simple, preparatory tests. For instance, when the di-acetate of SF–837 substance or the SF–837–$A_2$ substance is partially hydrolyzed in an aqueous 80% methanol (that is, a mixture of 80% by weight of methanol and 20% by weight of water) as the reaction medium under neutral reaction conditions, the desired mono-acetate of the SF–837 substance or the SF–837–$A_2$ substance may be obtained in satisfactory yields by carrying out the reaction at 55–65° C. for 20–24 hours. Furthermore, when the saponification reaction of the starting di-acetate is effected in an aqueous 50% methanol (that is, a mixture of 50% methanol+50% water) containing 10% by weight of sodium carbonate dissolved therein or in the aqueous 50% methanol containing 10% by weight of ammonia dissolved therein, it is suitable to employ a reaction temperature of 20–23° C. and a reaction time of 20–40 minutes in order to ensure that the desired mono-acetate is obtained in a satisfactory yield. Whatever the reaction conditions employed, if the saponification reaction proceeds to an excessive extent, the acetate group corresponding to the —OR$_2$ group of the Formula III of the starting di-acetate could be hydrolyzed, too, so that the initial SF-837 substance or SF-837-A$_2$ substance would begin to be formed. Accordingly it is desired that the reaction duration be limited to a suitable period of time.

In order to recover the desired mono-acetyl product formed from the reaction mixture, it is feasible to concentrate the reaction mixture to dryness by evaporation preferably under reduced pressure, giving the solid residue containing the desired product. Alternatively, a concentrated reaction mixture may be treated with a suitable organic solvent such as ethyl acetate to extract the desired product, and the extract solution may then be concentrated to a dryness by evaporation.

The mono-acetates of the SF-837 substance and of the SF-837-A$_2$ substance have physico-chemical properties as shown in Table 1 below.

The results shown in Table 2 were determined according to the double serial dilution method from the concentration of 10 mcg./ml., of the active substance. The growth of the micro-organisms tested were estimated after incubation for 24 hours at 37° C. with the micro-organisms Nos. 1 to 18, after incubation for 48 hours at 37° C. with the micro-organism No. 19, after incubation for 5 days at 37° C. with the micro-organism No. 20, and after incubation for 24 hours at 27° C. with the micro-organisms Nos. 21–22. With respect to the culture media used, the abbreviation "H.I.B." indicates Heart Infusion Broth (Difco); "T.B." Tomatos Juice Broth; "G.B" Glycerine Bouillon; and "S.B" Sabouraud Dextrose Broth in the above Table 2.

When acute toxicity was determined by oral administration to several groups of animals each consisting of 5 mice of the "dd"-strain, it was found that mono-acetate of the SF-837 substance exhibited an LD$_{50}$ value of more

TABLE 1

| Properties | SF-837 substance mono-acetate | SF-837-A$_2$ substance mono-acetate |
|---|---|---|
| Appearance | Colorless, needle-like crystal | |
| Melting point | 121–122° C. | 151–152° C. |
| Specific optical rotation, [α]d(c=1, ethanol) | −58° | −65° |
| Maximum absoprtion in ultra-violet spectrum (in 20 mg./ml. methanol) | 231 mμ ($E_{1\,com.}^{1\%}$=324) | 231 mμ ($E_{1\,com.}^{1\%}$=353) |
| Molecular weight (by mass-analysis) | 855 | 869 |
| Empirical formula | C$_{43}$H$_{69}$NO$_{16}$ | C$_{44}$H$_{71}$NO$_{16}$ |
| Elementary analysis: | | |
| Calculated | C 60.80, H 8.06, N 1.64% | C 60.74, H 8.23, N 1.61% |
| Found | C 61.12, H 8.26, N 1.75% | C 61.27, H 8.38, N 1.61% |

Referring to the attached drawings.

Figure 1:
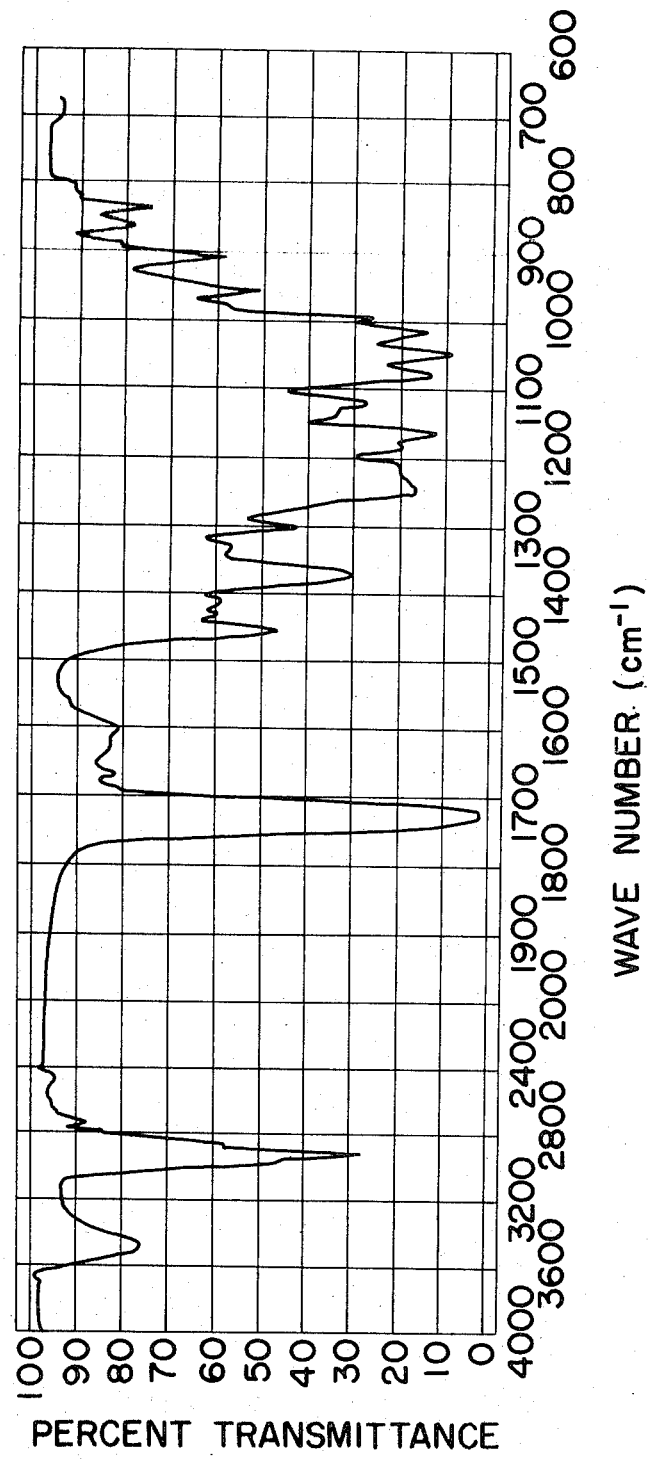
FIG. 1 shows a curve of the infra-red absorption spectrum of the mono-acetate of SF-837 substance pelleted in potassium bromide.
Figure 2:
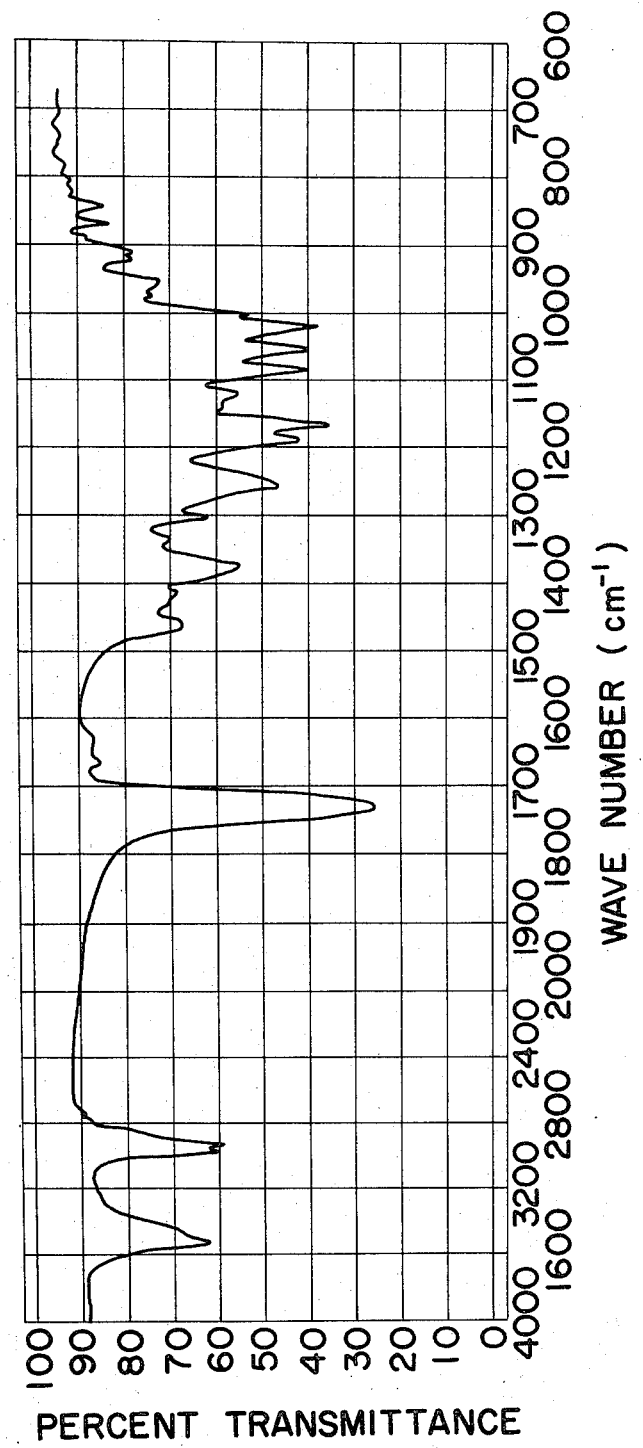
FIG. 2 shows a curve of the infra-red absorption spectrum of the mono-acetate of SF-837-A$_2$ substance pelleted in potassium bromide.

The mono-acetates of the SF-837 substance and SF-837-A$_2$ substance show unexpected advantages in that they give much less bitter taste on oral administration and exhibit remarkably higher curative effect (CD$_{50}$) and lower toxicity in comparison with the corresponding free bases and di-acetates.

The anti-bacterial spectra of the free bases, di-acetates and mono-acetates of the SF-837 substance and SF-837-A$_2$ substance against various micro-organisms are shown in Table 2 below, for comparison.

In this Table 2, the minimum inhibitory concentrations were determined by the broth dilution method.

than 10,000 mg./kg., and the monoacetate of the SF-837-A$_2$ substance an LD$_{50}$ value of 8,000 mg./kg. In contrast to this, the SF-837 substance (free base) exhibited an LD$_{50}$ value of 3,200 mg./kg., and SF-837-A$_2$ substance (free base) an LD$_{50}$ value of 3,100 mg./kg.

Tests of treating Streptococcus pyogenes infections were carried out using several groups each consisting of 10 mice of "ICR–JCL" strain. Thus, a suspension of the pathogenic bacteria Streptococcus pyogenes Ti–125 Gr-A type I was injected intraperitoneally to the mice each at an inoculum size of 100 times higher than the LD$_{50}$. Suspensions which had been prepared by dispersing different amounts of the mono-acetate of SF-837 substance in an aqueous solution of 2% gum arabic were then orally administered to the infected mice three times, namely at the ends of 30 minutes, 3 hours and 6 hours after the inoculation. After the treated mice were observed for 7 days, the curative effect was calculated according to the Litchfield-Wilcoxon method. The CD$_{50}$ value of 79 mg./kg. was

TABLE 2

| | | Minimum inhibitory concentrations (mcg./ml.) | | | | | |
|---|---|---|---|---|---|---|---|
| No. | Micro-organisms tested | Culture media | SF-837 substance mono-acetate | SF-837 substance di-acetate | SF-837 substance (free base) | SF-837-A$_2$ substance mono-acetate | SF-837-A$_2$ substance di-acetate | SF-837-A$_2$ substance (free base) |
| 1 | Staphylococcus aureus 209P | H.I.B. | 0.39 | 0.78 | 0.39 | 0.39 | 0.78 | 0.39 |
| 2 | Staphylococcus aureus Terajima | H.I.B. | 0.78 | | 0.78 | 0.78 | | 0.39 |
| 3 | Staphylococcus aureus Aritomi | H.I.B. | 0.78 | 1.56 | 0.78 | 0.78 | 1.56 | 0.78 |
| 4 | Staphylococcus albus POI 1200A | H.I.B. | 0.39 | | 0.39 | 0.39 | | 0.39 |
| 5 | Streptococcus hemolyticus D-90 | H.I.B. | 0.78 | | 1.56 | 1.56 | | 0.78 |
| 6 | Streptococcus pyogenes Ti-125 | H.I.B. | 0.05 | 0.1 | 0.05 | 0.05 | 0.1 | 0.05 |
| 7 | Streptococcus faecalis ATCC 8043 | H.I.B. | 1.56 | | 1.56 | 1.56 | | 1.56 |
| 8 | Streptococcus salivarius 9758 IID | H.I.B. | 0.78 | 1.56 | 0.78 | 0.39 | 0.78 | 0.39 |
| 9 | Sarcina lutea PCI 1001 | H.I.B. | 0.1 | 0.1 | 0.1 | 0.39 | 0.1 | 0.1 |
| 10 | Diplococcus pneumoniae type 3 IID | H.I.B. | 0.39 | | 0.39 | 0.2 | | 0.2 |
| 11 | Bacillus subtilis ATCC 6633 | H.I.B. | 0.39 | 0.78 | 0.39 | 0.39 | 0.4 | 0.39 |
| 12 | Bacillus cereus IAM 1110 | H.I.B. | 0.78 | | 0.78 | 0.78 | | 0.78 |
| 13 | Proteus vulgavis IAM 1025 | H.I.B. | >100 | >100 | >100 | >100 | >100 | >100 |
| 14 | Klebsiella pneumoniae PCI 602 | H.I.B. | 50 | | 50 | 50 | | 50 |
| 15 | Pseudomonas aeruginosa IAM 1007 | H.I.B. | >100 | >100 | >100 | >100 | >100 | >100 |
| 16 | Escherichia coli IAM 1253 | H.I.B. | >100 | >100 | >100 | >100 | >100 | >100 |
| 17 | Salmonella paratyphi A | H.I.B. | >100 | | >100 | >100 | | >100 |
| 18 | Salmonella paratyphi B | H.I.B. | 50 | | 25 | 50 | | 25 |
| 19 | Shigella sonnei 191-66 | H.I.B. | >100 | | 100 | >100 | | 100 |
| 20 | Lactobacillus cosei ATCC 7469 | T.B. | 25 | | 100 | 50 | | 50 |
| 21 | Mycobacterium smegmatis 607 | G.B. | 25 | >25 | 25 | >25 | >25 | >25 |
| 22 | Candida albicans | S.B. | 100 | >100 | >100 | >100 | >100 | >100 |
| 23 | Saccharomyces cerevisiae IAM 4626 | S.B. | 100 | >100 | >100 | >100 | >100 | >100 | obtained. By similar tests the SF–837 substance (free base) exhibited a $CD_{50}$ value of 165 mg./kg., and the di-acetate of SF–837 substance a $CD_{50}$ value of 170 mg./kg. in the treatment of the *Streptococcus pyogenes* infections in mice. In another series of similar tests the $CD_{50}$ value of 94 mg./kg. was obtained for the mono-acetate of the SF–837–$A_2$ substance in the *Streptococcus pyogenes* infections in mice, while the SF–837–$A_2$ substance (free base) and the di-acetate of the SF–837–$A_2$ substance exhibited the $CD_{50}$ value of 190 mg./kg., and 190 mg./kg., respectively.

From the results of the above experiments it is evident that the mono-acetate of SF–837 substance and the mono-acetate of SF–837–$A_2$ substance which are produced by the present invention are much more excellent as the antibacterial agent than their corresponding free bases and di-acetates. When the mono-acetate of SF–837 substance and the mono-acetate of SF–837–$A_2$ substance are used for therapeutic purpose in practice, they may be made up in a conventional pharmaceutical manner into various formulations suitable for oral administration such as tablets, capsules, pulver and granules.

The invention is now illustrated with reference to examples but to which the present invention is limited in no way.

EXAMPLE 1

This example illustrates the preparation of the di-acetate of the SF–837 substance which may be used as the starting material for the process of the invention.

In a mixture of 25 ml. of pyridine and 12.5 ml. of acetic anhydride was dissolved 5 g. of the SF–837 substance (free base), and the solution was allowed to stand overnight at room temperature and then 150 ml. of ice-water was poured into the solution, giving precipitate. The mixture was allowed to stand until the ice was melt away. The mixture was subsequently adjusted to pH 9.0 by addition of aqueous sodium hydroxide, extracted with 75 ml. of ethyl acetate twice, and the extract was washed with water and then dehydrated with sodium sulfate. The dry solution was distilled under reduced pressure to remove ethyl acetate, and the residue was dried to give 4.9 g. of the di-acetyl derivative of the SF–837 substance in the form of a white colored powder.

EXAMPLE 2

In 200 ml. of an aqueous 80% methanol (a mixture of 80% methanol plus 20% water) was dissolved 4.9 g. of the di-acetate of SF–837 substance which had been prepared in the process of Example 1. The solution was then allowed to stand at 55–60° C. overnight (for a reaction time of 20–24 hours). The reaction mixture was concentrated by distilling off the methanol under reduced pressure. The concentrate was then adjusted to pH 9.0 by addition of sodium hydroxide and extracted with 50 ml. of ethyl acetate to take up the mono-acetate of SF–837 substance into the ethyl acetate. This extract solution was washed with water, dehydrated with sodium sulfate and then concentrated to dryness to give 4.5 g. of a white colored powder. Recrystallization of this powder from a small volume of acetone gave 3.6 g. of needless (80% yield). This material was then identified as the mono-acetate of the SF–837 substance.

EXAMPLE 3

This example illustrates a preparation of the di-acetate of SF–837–$A_2$ substance.

In a mixture of 25 ml. of pyridine and 12.5 ml. of acetic anhydride was dissolved 5 g. of the SF–837–$A_2$ substance (free base), and the solution was allowed to stand overnight in a refrigerator. To the cold solution was poured 150 ml. of ice-water under agitation, and the precipitate formed was filtered out, washed with water and dried. There was obtained 4.8 g. of the di-acetyl derivative of the SF–837–$A_2$ substance.

EXAMPLE 4

In 180 ml. of aqueous 80% methanol was dissolved 4.8 g. of the di-acetate of SF–837–$A_2$ substance which was obtained in Example 3, and the solution was allowed to stand at 55–60° C. After the reaction duration amounted to 20–24 hours, the reaction mixture was distilled under reduced pressure to remove the methanol. The concentrate obtained was then extracted with 50 ml. of chloroform. The chloroform extract was washed with water, dehydrated and then concentrated to dryness to give 4.4 g. of the mono-acetate of SF–837–$A_2$ substance in the form of a white colored powder. When this powder was crystallized from a small volume of acetone, there was obtained 3.5 g. of the needles of the monoacetate of SF–837–$A_2$ substance. The needless were then confirmed to be the mono-acetyl derivative of the SF–837–$A_2$ substance.

EXAMPLE 5

5 g. of a mixture containing 50% by weight of the SF–837 substance (free base) and 50% by weight of the SF–837–$A_2$ substance (free base) was treated in the same manner as in Example 3 to give 4.6 g. of a mixture of the di-acetyl derivatives of the SF–837 and SF–837–$A_2$ substances. This mixture was dissolved in 180 ml. of n-butanol commercially available, and the resulting solution was allowed to stand overnight at 55–60° C. After the reaction had proceeded in the solution for 20–24 hours, the reaction mixture was distilled under reduced pressure to remove the n-butanol. The residue obtained was taken up into 50 ml. of chloroform, and the chloroform solution was washed with water, dehydrated and then concentrated to dryness, so that 4.4 g. of a mixture of mono-acetates of the SF–837 substance and the SF–837–$A_2$ substance was obtained.

EXAMPLE 6

20 g. of a mixture comprising 59% by weight of the SF–837 substance (free base) and 30% by weight of the SF–837–$A_2$ substance (free base) was acetylated in a similar way to Example 3 to give 18.72 g. of a mixture comprising the di-acetates of SF–837 substance and the SF–837–$A_2$ substance. This mixture of the aforesaid di-acetates was then fractionated and purified by chromatography over silica gel, using a mixture of 10:1 benzene-acetone as the developing solvent, so that 5.8 g. of the di-acetate of SF–837 substance and 4.4 g. of the di-acetate of SF–837–$A_2$ substance were obtained separately.

5.8 g. of the di-acetate of SF–837 substance and 4.4 g. of the di-acetate of SF–837–$A_2$ substance obtained from the above process were then separately treated in a similar way to Example 4, with results that 5.2 g. of the mono-acetate of SF–837 substance and 4.0 g. of the mono-acetate of SF–837–$A_2$ substance were yielded, respectively.

EXAMPLE 7

In 30 ml. of butyl acetate was dissolved 8.13 g. of a mixture comprising the SF–837 substance (free base) and the SF–837–$A_2$ substance (free base), and to the resulting solution were added 12.24 g. of acetic anhydride and 9.84 g. of anhydrous sodium acetate. The whole was agitated at room temperature for 1 hour and then heated at 55–60° C. for 14 hours to effect the acetylation. After the completion of the reaction, 60 ml. of ice-water was poured into the reaction mixture which was subsequently adjusted to pH 9.0 by addition of aqueous sodium hydroxide and allowed to stand. The butyl acetate layer was separated, removed, washed with water, dehydrated and concentrated to dryness to give 8.41 g. of a mixture comprising the di-acetates of SF–837 substance and the SF–837–$A_2$ substance.

8.41 g. of the mixture of the di-acetates of the SF–837 and SF–837–$A_2$ substances obtained from the above process was then added to 34 ml. of an aqueous 50% methanol (namely, a mixture of 50% by weight of methanol plus 50% by weight of water) containing 10% by weight of ammonia dissolved therein, and the whole was agitated at room temperature for 0.5–2 hours to effect the partial hydrolysis of the starting di-acetate. The reaction mixture was then distilled under reduced pressure to remove the methanol. The concentrate obtained was extracted twice with 15 ml. of butyl acetate, and the extracts were combined together, washed with water, dehydrated and then concentrated by evaporation to dryness. There was otbained 7.4 g. of a mixture of mono-acetates of the SF–837 substance and the SF–837–$A_2$ substance in the form of a white colored powder.

What we claim is:

1. The mono-acetates of SF–837 substance and SF–837–$A_2$ substance represented by the formula:

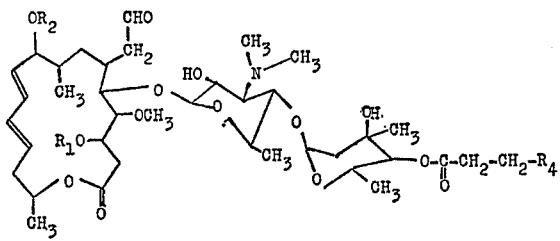

where $R_1$ is propionyl, $R_2$ is acetyl and $R_4$ is selected from the group consisting of hydrogen and methyl.

2. The mono-acetate of SF–837 substance represented by the formula:

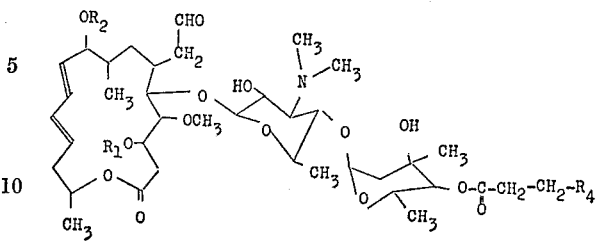

where $R_1$ is propionyl, $R_2$ is acetyl and $R_4$ is hydrogen.

3. The mono-acetate of SF–837–$A_2$ substance represented by the formula

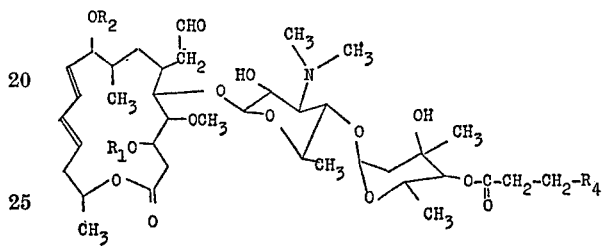

where $R_1$ is propionyl, $R_2$ is acetyl, and $R_4$ is methyl.

References Cited
UNITED STATES PATENTS

| | | | |
|---|---|---|---|
| 3,318,866 | 5/1967 | Hoeksema | 260—210 R |
| 3,424,743 | 1/1969 | Uzu et al. | 260—210 R |
| 3,455,900 | 7/1969 | Birkenmeyer et al. | 260—210 R |
| 3,535,309 | 10/1970 | Hata et al. | 260—210 R |

JOHNNIE R. BROWN, Primary Examiner

U.S. Cl. X.R.

424—181